INVENTOR
CHARLES E. KONRAD
BY

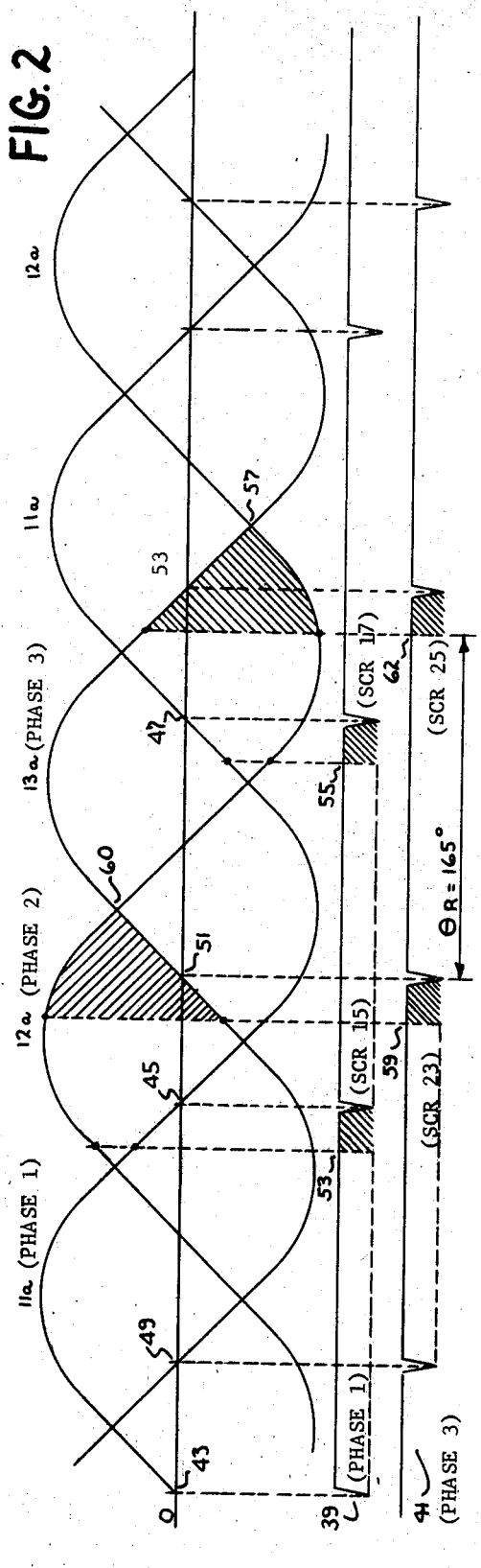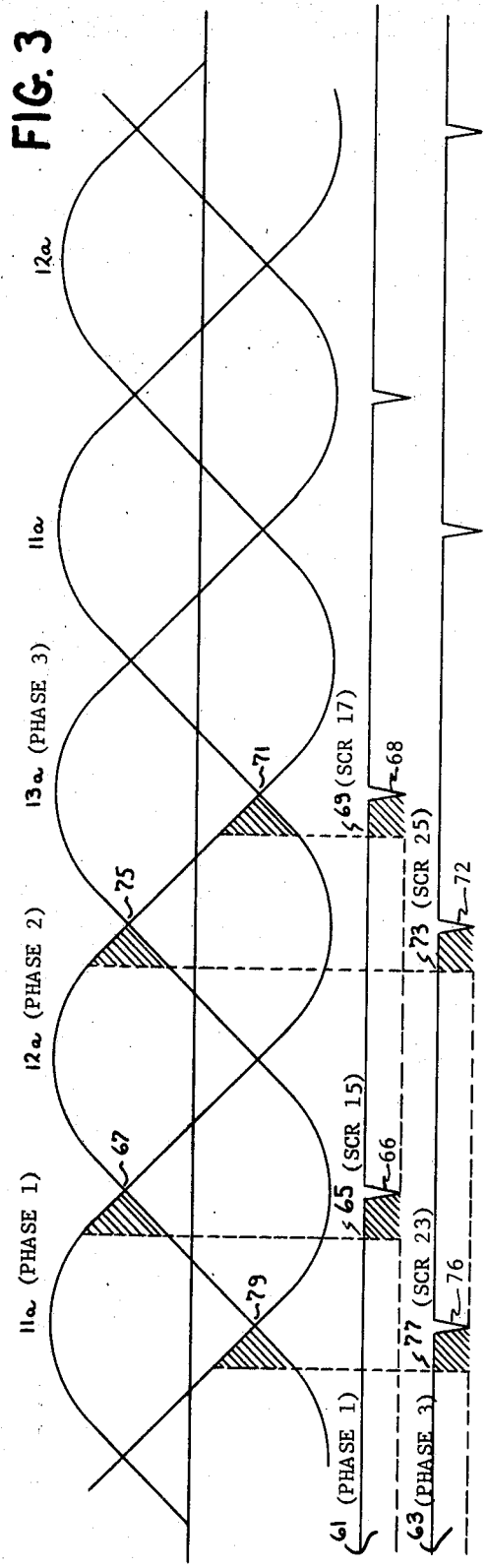

United States Patent Office 3,497,796
Patented Feb. 24, 1970

3,497,796
SYNCHRONOUS GATING OF BILATERAL
SWITCHES IN A THREE PHASE SYSTEM
Charles E. Konrad, Roanoke, Va., assignor to General
Electric Company, a corporation of New York
Filed July 7, 1967, Ser. No. 651,797
Int. Cl. G05f 5/00
U.S. Cl. 323—24          8 Claims

ABSTRACT OF THE DISCLOSURE

In a three phase system two silicon controlled rectifiers control the current in two of the three phases. One phase is uncontrolled. Each silicon controlled rectifier is synchronized to the line-to-neutral voltages and then a transformer is added in the first phase control circuit to advance the gating signal to the silicon controlled rectifiers in the first phase and a transformer is added in the third phase to delay the gating signal to the silicon controlled rectifier in the third phase.

---

This invention is directed to a three phase system where the current from the power source to the load is controlled in only two of the three phases.

To achieve 180° control with a resistive load the turning on of the current control device must be synchronized to the line-to-neutral voltages. However on short conduction angles a large single phase current can circulate through the load.

According to this invention therefore a three phase system has a load energized from a three phase power source. The second phase is not controlled. A first pair of back-to-back silicon controlled rectifiers are connected in the first phase and a second pair of silicon controlled rectifiers are connected in the third phase.

The silicon controlled rectifiers in the first phase are gated on in by a trigger circuit which is synchronized by a synchronizing signal which leads the line-to-neutral voltage of phase one by a significant lead angle and the silicon controlled rectifiers in the third phase are gated on by a trigger circuit which is synchronized by a synchronizing signal which lags the line-to-neutral voltages of phase three by a significant angle.

In the drawings FIG. 1 shows a three phase system constructed according to this invention.

FIG. 2 shows the waveforms for a three phase system showing the problems of previous three phase systems.

FIG. 3 shows the waveforms of a three phase system constructed according to this invention.

Figure 1:
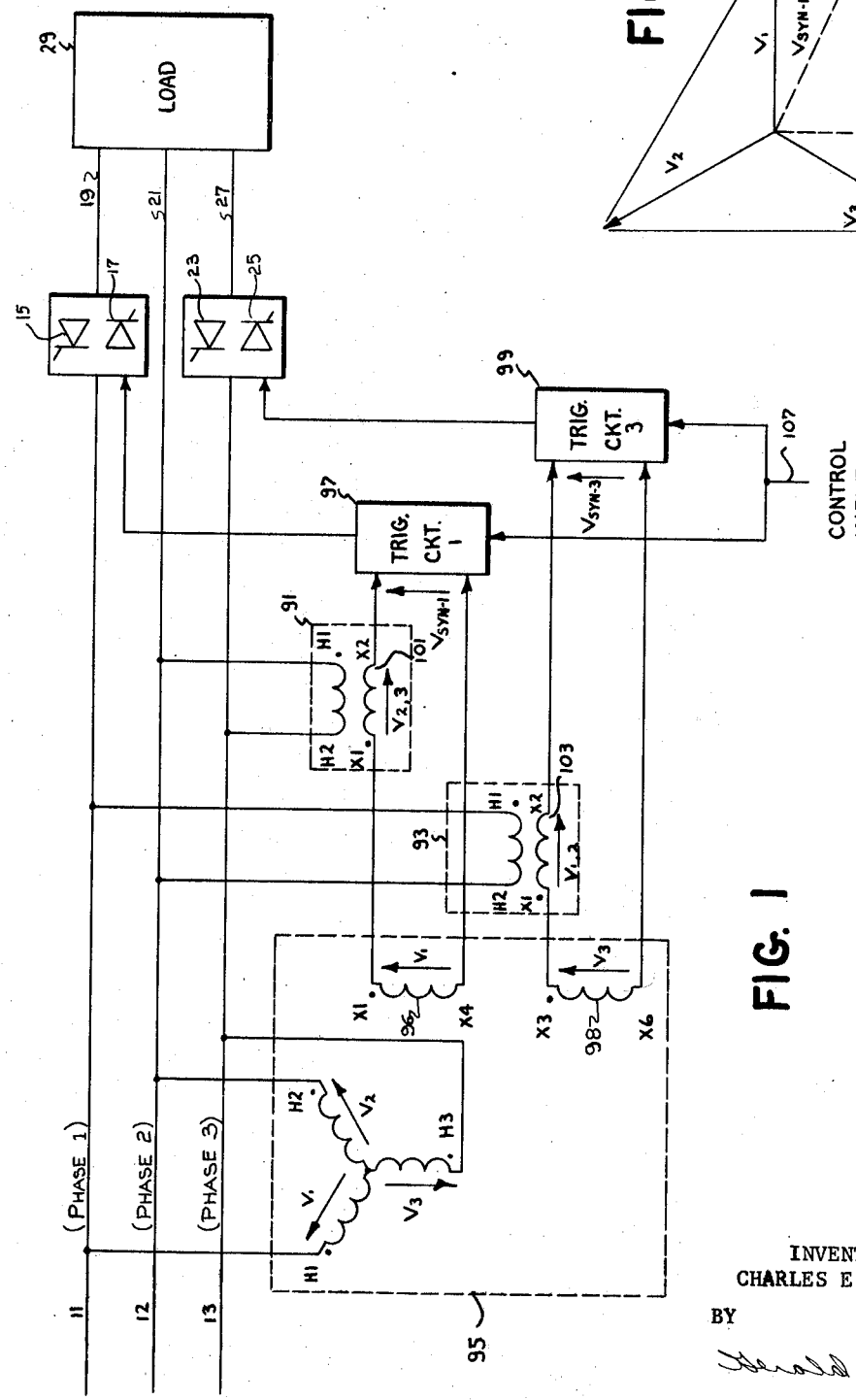

Referring now to FIG. 1, numerals 11, 12 and 13 indicate the power source of a three phase system, numeral 11 indicates phase 1, 12 indicates phase 2 and 13 indicates phase 3. In phase 1, the cathode of silicon controlled rectifier 15 is connected to power source 11 and the anode to the first leg 19 of a three phase load 29. The cathode of silicon controlled rectifier 17 is connected to the first leg 19 of the three phase load 29 and the anode to power source 11. The power source 12 of phase 2 is connected directly to a second leg 21 of the three phase load 29.

The cathode of silicon controlled rectifier 23 is connected to the power source 13 of phase 3 and the anode connected to a third leg 27 of the three phase load 29. The cathode of silicon controlled rectifier 25 is connected to the third leg 27 of the three phase load 29 and the anode to the power source 13.

The current applied to the load 29 is controlled by changing the firing angle of the silicon controlled rectifiers 15 and 17 in phase 1 and 23 and 25 in phase 3. No control is applied directly to phase 2.

A three phase transformer 95 controls the synchronizing signals to silicon controlled rectifier gating circuits 97 and 99. The primary winding of the three phase transformer 95 is connected in wye, with its input terminals H1, H2 and H3 connected to the power supplied 11, 12, and 13, respectively. The two secondary windings 96 and 98 having output terminals X1 and X4 associated with phase 1, and output terminals X3 and X6 associated with phase 3 are connected to the silicon controlled rectifier gating circuits 97 and 99. These secondary windings 96 and 98 are connected in series with a secondary winding 101 and 103, respectively, of transformers 91 and 93. The secondary winding 96 is connected through secondary winding 101 of transformer 91 to the silicon controlled rectifier gating circuit 97. In a similar manner the secondary winding 98 is connected through secondary winding 103 of transformer 93 to the input of silicon controlled rectifier gating circuit 99. The primary winding of transformer 93 is connected to power supply 11 and to power supply 12, and the primary winding of transformer 91 is connected to power supply 12 and 13. The secondary windings of the three phase transformer 95 reflects the phase relationship of phase 1 in secondary winding 96 and the phase relationship of phase 3 in secondary winding 98. As the primary winding of transformer 91 is connected across phases 2 and 3 so that the secondary winding 101 of transformer reflects the line-to-line voltage V23. The primary winding of transformer 93 is connected across phases 1 and 2 so that the secondary winding 103 of transformer 93 reflects the line-to-line voltage V21.

Transformer 93 advances the gate signal from trigger circuit 99 by 30° and transformer 103 delays the gate signal from trigger circuit by 30°.

Referring to FIG. 3 the waveforms of a balanced loaded three phase system are represented by curves 11a (phase 1), 12a (phase 2), and 13a (phase 3). The timing of the gate voltages of silicon controlled rectifiers 15 and 17 is shown in timing chart 61. The gate signals are advanced 30° with respect to the line-to-neutral voltage in phase 1 as represented by curve 11a. The timing of silicon controlled rectifiers 23 and 25 is shown in timing chart 63 which shows that the gate signal applied to these silicon controlled rectifiers is delayed by 30° with respect to the phase-to-neutral voltage in phase 3 as represented by curve 13a. This advance and delay from the phase-to-neutral voltage is shown by gate signals 66, 68, 72 and 74.

Referring now to phase 1 curve 11a and the associated gate signal timing chart 61, using a 165° retard angle then it can be seen that at the point 65 where silicon controlled rectifier 17 is gated on the voltage of phase 1 (curve 11a) is more positive than the voltage in phase 2 (curve 12a) so that the silicon controlled rectifier 17 will fire and conduct for a period of 15°, until the voltage in phase 2 (curve 12a) becomes more positive than the voltage in phase 1 (curve 11a at point 67), causing the silicon controlled rectifier 17 to be reverse biased, thereby turning it off. The firing of silicon controlled rectifier 15 is similarly advanced so that when the gate signal is applied to the gate thereof (point 69 of timing chart 61) the voltage in phase 1 is more negative than the voltage in phase 2 and the silicon controlled rectifier 15 will fire and conduct for the remaining 15° before it is turned off (point 71) by being reverse biased through a voltage in phase 2 (curve 12a) which is less negative than the voltage in phase 1 (curve 11a). In this manner by advancing the gate signals to the silicon controlled rectifiers 15 and 17 in phase 1 by 30°, they will fire for the correct number of degrees during the greater retard angles.

In phase 3 (curve 13a) the gate signals are delayed by 30° with respect to the phase-to-neutral voltage and when the gate voltage is applied to silicon controlled rectifier 25 at point 77, with a retard angle of 165° the voltage in phase 3 (curve 13a) is more positive than the voltage in phase 2 (curve 12a), causing the silicon controlled rectifier 25 to fire and conduct for 15° after which the voltage in phase 2 (curve 12a) reverse biases the silicon controlled rectifier at point 79 and turns it off. Similarly silicon controlled rectifier 23 receives its gate signal at a 165° retard angle and fires because phase 3 is more negative than phase 2 (point 73). The silicon controlled rectifier 23 conducts for a period of 15° at the end of which phase 2 becomes less positive than phase 3 (point 75) thus causing silicon controlled rectifier 23 to turn off. In the manner described by advancing the gate signals to the silicon controlled rectifiers 15 and 17 in phase 1 and delaying the gate signals from the phase-to-neutral voltage to the silicon controlled rectifiers 23 and 25 in phase 3, each of these phases supplies power to the load at a balanced rate during the large retard angles.

The 30° of lagging compensation introduced into the synchronizing signals (63) for the gating of silicon controlled rectifiers 23 and 25 of phase 3 results in an inability to achieve 180° of csurrent in the phase 3 load leg 27 with a resistive load. With a minimum retard angle, the line-to-neutral voltage of phase 3 (13) is 30° past the zero crossover and this portion of the supply voltage cannot be gated to the load leg 27. However, should the load power factor be 30° lagging, which is typical for induction motors, forward bias across the silicon controlled rectifiers 23 and 25 will not occur until 30° after the zero crossovers of the line-to-neutral voltage (13). Hence, the lagging compensation introduced into the synchronizing signals (63) for silicon controlled rectifiers 23 and 25 by the compensating transformer 93 does not limit the maximum voltage obtainable across load leg 27 when the load power factor is greater than 30° lagging.

While the compensation scheme described does not produce balanced voltages to the load for all retard angles, it does achieve two important objectives which enable the use of the four silicon controlled rectifier power circuits to control the speed of induction motors. First, it eliminates the single phase currents which would normally occur with large retard angles; and secondly, it moves the point of maximum unbalance to the region of small retard angles where the percentages of unbalance will be the least.

A Triac may be substituted in each phase for the two silicon controlled rectifiers.

Figure 4:
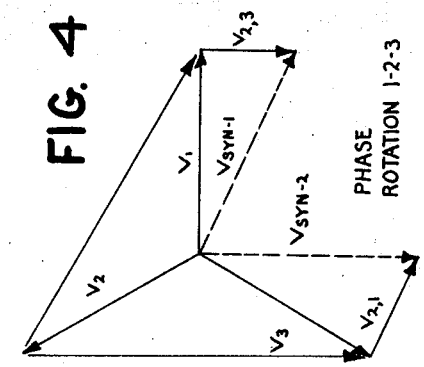
FIG. 4 shows a vector diagram of a three phase system.

For a more complete illustration of the phase relationships see FIG. 4 where vectors V1, V2 and V3 represent the voltages in the three phases 1, 2 and 3, respectively, in a phase rotational arrangement of 1–2–3. The voltages produced by transformers 91 and 93 are identified on the vector diagram by V21 at 90° to V3 and V23 at 90° to V1.

The resultant voltage of the combination V1 and V23 is represented by vector Vsyn–1 and of the combination V3 and V21 is represented by the vector Vsyn–2. Vsyn–1 and Vsyn–2 represent the voltage signals which are applied to the silicon controlled rectifier gating circuits 97 and 99 and produce the desired 30° advance in the gate signals of the silicon controlled rectifiers of phase 1 and the desired delay of 30° in the gate signals for the silicon controlled rectifiers of phase 3. The firing angle of the silicon controlled rectifiers is adjusted from a control input 107 whereby the torque of a motor load can be adjusted. The length of the vectors V21 and V23 is dependent on the secondary voltage of the transformers 91 and 93 and is determined by the angle to which the gate of the slicon controlled rectifier's synchronizing voltage of phase 1 should be advanced, and the gate synchronizing signals of the silicon controlled rectifiers in phase 3 should be retarded. The angle in this case is 30° so that the length of vectors V21 and V23 is equal to V3 tan 30° and V1 tan 30°, respectively.

The desired synchronizing signals (Vsyn–1 and Vsyn–2 of FIG. 4) may also be obtained directly from input power lines. Note in FIG. 4 that the desired synchronizing signal for phase 1 (Vsyn–1) is in time phase with the incoming line-to-line voltage V21 and the desired synchronizing signal for phase 3 (Vsyn–2) is in time phase with incoming line-to-line voltage V23. When the line-to-neutral voltages are not required for other control functions, small transformers may be connected line-to-line to obtain signals with the proper time-phase relationships required to synchronize the trigger circuits.

FIG. 2 shows the waveforms supplied to a three phase circuit from a balanced source and the resulting problems obtained without the benefit of the invention. The gating signals are shown for triggering the silicon controlled rectifiers where the triggering signals are applied to the silicon controlled rectifiers in synchronism with the phase-to-neutral voltages in the respective phase. A triggering signal is applied to silicon controlled rectifiers 15 and 17 at points 43, 45 and 47 as the voltage in phase 1 passes through neutral, and the firing signal is applied to silicon controlled rectifiers 23 and 25 at points 49, 51, and 53 when the voltage in phase 3 passes through zero. As the firing signal is applied at the beginning of each half cycle of phase 1 and phase 3 as explained above, the controlling silicon controlled rectifiers for that phase fire and conducts. That current is applied to the load 29 until the controlling silicon controlled rectifiers becomes reverse biased and turns off. With the silicon controlled rectifiers fired at the beginning of each half cycle the load 29 has full voltage applied thereto. If the load 29 is a motor, the motor has rated voltage applied.

An unbalance arises when firing of the silicon controlled rectifiers 15, 17, 23 and 25 is retarded. For example, a retard angle of 165° is used, then (as shown in FIG. 2) the firing signal voltage is applied to the gate of silicon controlled rectifier 17 at point 53. However, silicon controlled rectifier 17 is reverse biased as the voltage of phase 2 (shown by curve 12a) is more positive at this point than the volage of phase 1 (shown by cure 11a). Silicon controlled rectifier 17 therefore does not not conduct so that no current is supplied to leg 19 of load 29 for the remaining 15° of this half cycle. Silicon controlled rectifier 15 is triggered at point 55 as shown on gate timing chart 39, however, the voltage of phase 2 is more negative than the voltage of phase 1 at this point and silicon controlled rectifier 15 is therefore reverse biased and does not conduct.

In phase 3, a retard angle of 165° causes a different result. The firing signal applied to silicon controlled rectifier 25 at point 62, fires rectifier 25 as the voltage of phase 3 is more positive than the voltage in phase 2 at point 62 and the silicon controlled rectifier 25 is forward biased. The silicon controlled rectifier 25 continues to conduct until the voltage in phase 2 becomes more positive than the voltage in phase 3 at point 57. Silicon controlled rectifier 25 in phase 3 has then conducted for a full 45°. Similarly, silicon controlled rectifier 23 has its gate signal applied at a retard angle of 165° (point 59) since phase 2 is more positive than phase 3. Silicon controlled rectifier 23 will fire and conduct for 45° after which phase 3 becomes more positive than phase 2 and turns the silicon controlled rectifier 23 off (point 60). Since silicon controlled rectifiers 15 and 17 have not conducted at all during this cycle a large single phase circulating current from phase 3 is applied to the load 29 during the last part of each cycle when large retard angles are used for firing the silicon controlled rectifiers.

I claim:
1. A balanced three phase system comprising,
   a balanced three phase power supply,
   a balanced three phase load,
   a first controlled solid state bilateral switching means connected in the one phase between said load and said power supply,
   a second controlled solid state bilateral switching means connected in another phase between said load and said power supply, one of said phases having no control means therein, means for applying gating signals to said first and second controlled solid state bilateral switching means, means for providing electrical signals in synchronism with the frequency of the three phase power supply for said gating means to provide a predetermined time base from which the retard angles of said gating means can be referenced, said gating means responsive to the electrical signals from said synchronizing means so that the gating signals from said gating means to said first controlled solid state bilateral switching means leads the line-to-neutral voltage of the other phase by a constant degree.

2. The invention as claimed in claim 1 wherein the one phase in which the first controlled solid stage bilateral switching means is connected is the first phase, and the other phase in which the second controlled solid state bilateral switching means is connected is the third phase.

3. The invention as claimed in claim 2 wherein the first controlled solid state bilateral switching means consists of a pair of back-to-back silicon controlled rectifiers, and the second controlled solid state bilateral switching means consists of a pair of back-to-back silicon controlled rectifiers.

4. The invention as claimed in claim 3 wherein said gating means consists of a first trigger circuit for applying gating signals to the gate electrodes of said first pair of back-to-back silicon controlled rectifiers, and a second trigger circuit for applying gating signals to the gate electrodes of said second pair of back-to-back silicon controlled rectifiers.

5. The invention as claimed in claim 4 wherein said synchronizing means consists of a three phase transformer with its primary windings connected to said three phase power supply, and secondary windings connected to said first and second trigger circuits.

6. The invention as claimed in claim 5 where a first secondary winding of said three phase transformer is connected to said first trigger circuit, and a second secondary winding of said three phase transformer is connected to said second trigger circuit.

7. The invention as claimed in claim 6 wherein a first transformer has a primary winding connected to the first and second phase of said power supply and a secondary winding connected between the first secondary winding of said three phase transformer and said first trigger circuit to provide a first predetermined time base so that the gating signals from said first trigger circuit to said first pair of silicon controlled rectifiers lead the line-to-neutral voltage of the first phase by a significant degree, and a second transformer has a primary winding connected to the second and third phase of said power supply and a secondary winding connected between the second secondary winding of said three phase transformer and said second trigger circuit to provide a second predetermined time base so that the gating signals from said second trigger circuit to said second pair of silicon controlled rectifiers lag the line-to-neutral voltage of the third phase by a significant degree.

8. The invention as claimed in claim 7 where the leading angle is approximately 30°, and the lagging angle is approximately 30°.

References Cited

UNITED STATES PATENTS

| 2,666,888 | 1/1954 | Riley et al. | 323—4 X |
| 3,253,202 | 5/1966 | Cotton | 318—227 |
| 3,346,795 | 10/1967 | Linke | 318—230 X |
| 3,364,412 | 1/1968 | Sauter | 321—5 |

LEE T. HIX, Primary Examiner

G. GOLDBERG, Assistant Examiner

U.S. Cl. X.R.

307—127, 133; 318—227, 230; 323—25, 36, 41